(12) United States Patent
Charbonnel

(10) Patent No.: US 11,131,226 B2
(45) Date of Patent: Sep. 28, 2021

(54) METHOD AND SYSTEM FOR THERMAL CONTROL OF AFTERTREATMENT

(71) Applicant: Caterpillar Inc., Deerfield, IL (US)

(72) Inventor: Sylvain J. Charbonnel, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 148 days.

(21) Appl. No.: 16/519,776

(22) Filed: Jul. 23, 2019

(65) Prior Publication Data

US 2021/0025304 A1 Jan. 28, 2021

(51) Int. Cl.
*F01N 3/18* (2006.01)
*F02D 1/16* (2006.01)

(52) U.S. Cl.
CPC ............. *F01N 3/18* (2013.01); *F02D 1/16* (2013.01); *F01N 2900/08* (2013.01); *F01N 2900/1602* (2013.01); *F02D 2001/167* (2013.01)

(58) Field of Classification Search
CPC ............ F01N 3/18; F01N 2900/1602; F01N 2900/08; F02D 1/16; F02D 2001/167
See application file for complete search history.

(56) References Cited

U.S. PATENT DOCUMENTS

| | | | |
|---|---|---|---|
| 5,419,122 A | 5/1995 | Tabe | |
| 6,463,732 B2 * | 10/2002 | Baeuerle | F01N 11/005 60/274 |
| 6,668,545 B2 | 12/2003 | Brown | |
| 9,732,688 B2 * | 8/2017 | Cygan, Jr. | F02D 41/0255 |
| 9,909,482 B2 | 3/2018 | Ardanese et al. | |
| 10,519,883 B2 * | 12/2019 | Solomon | F02D 9/02 |
| 10,900,447 B2 * | 1/2021 | Hu | F02M 26/06 |
| 2002/0139110 A1 | 10/2002 | Brown | |
| 2010/0199634 A1 * | 8/2010 | Heaton | B01D 53/9495 60/274 |
| 2011/0264353 A1 * | 10/2011 | Atkinson | F02D 41/1405 701/102 |
| 2013/0197778 A1 * | 8/2013 | Rodriguez | F02D 45/00 701/102 |
| 2018/0149059 A1 * | 5/2018 | Froberg | F02D 41/0235 |
| 2018/0252175 A1 | 9/2018 | Ikejiri et al. | |
| 2019/0368437 A1 * | 12/2019 | Solomon | F01N 3/20 |

FOREIGN PATENT DOCUMENTS

EP 0947683 10/1999

* cited by examiner

*Primary Examiner* — Joseph J Dallo
*Assistant Examiner* — Kurt Philip Liethen
(74) *Attorney, Agent, or Firm* — Bookoff McAndrews

(57) ABSTRACT

A method for controlling an internal combustion engine system including a catalyst includes receiving a desired output for an internal combustion engine, and receiving sensor information including information indicative of a temperature of the catalyst. The method includes calculating a plurality of sets of engine performance values based on respective sets of candidate control points, the engine performance values including a temperature change rate at which the temperature of the catalyst changes over time, and determining whether the temperature change rate satisfies a minimum warmup rate for the catalyst. The method also includes controlling the internal combustion engine based on a selected set of candidate control points and the minimum warmup rate.

20 Claims, 2 Drawing Sheets

METHOD AND SYSTEM FOR THERMAL CONTROL OF AFTERTREATMENT

TECHNICAL FIELD

The present disclosure relates generally to internal combustion engines, and more particularly, to methods and systems for control of internal combustion engine systems having one or more exhaust aftertreatment devices.

BACKGROUND

Internal combustion engines are used in various vehicles, mobile machines, and stationary machines to perform work or generate power by the combustion of a fuel, such as diesel fuel. The combustion of diesel fuel may produce pollutants such as unburned hydrocarbons, carbon monoxide, and nitrogen oxides (NOx). Aftertreatment devices, such as oxidation or selective catalytic reduction (SCR) catalysts, reduce the amount of potentially harmful emissions that are produced by internal combustion engines. Oxidation catalysts, for example, catalyze a reaction with NOx that converts NOx to harmless compounds. Aftertreatment systems may include other aftertreatment devices, such as particulate filters, and/or a plurality of catalysts to further assist in the reduction of unwanted emissions.

Catalysts may perform adequately within a particular range of temperatures. For example, catalysts may have a particular temperature, known as the catalyst light-off temperature, at which performance (conversion efficiency) is approximately 50% of the potential for the catalyst. The light-off temperature may be 200 degrees Celsius, 300 degrees Celsius, or higher. Thus, a large amount of unwanted emissions may be produced while the temperature of the catalyst is below the light-off temperature. Depending on the type of engine, it may take five minutes or more for exhaust gas to warm the catalyst to a sufficient operating temperature when operating the engine from a cold start. Various devices and strategies have been employed to decrease the amount of time needed to warm catalysts to a sufficient temperature. For example, engine systems may include heaters (e.g., electrical heaters). However, such heaters may add to the expense and size of the aftertreatment system.

An exemplary catalyst warm-up assessment method is disclosed in U.S. Pat. No. 6,668,545 B2 ("the '545 patent") to Brown. The system described in the '545 patent includes a pair of air/fuel ratio sensors that are used to calculate an oxygen storage characteristic of a catalyst. The measure of catalyst oxygen storage is compared to a threshold to assess whether the a rate at which a temperature of a catalyst warms-up is sufficiently fast. The '545 patent may set a flag in diagnostic memory when the warm-up is insufficient.

While the warm-up assessment of the '545 patent may be useful in some situations, it may not provide a process for controlling the operation of an engine to warm the catalyst at a sufficient rate. Moreover, the '545 patent may not provide a system that adapts to changing ambient conditions.

The disclosed method and system may solve one or more of the problems set forth above and/or other problems in the art. The scope of the current disclosure, however, is defined by the attached claims, and not by the ability to solve any specific problem.

SUMMARY

In one aspect, a method for controlling an internal combustion engine system including a catalyst may include receiving a desired output for an internal combustion engine, and receiving sensor information including information indicative of a temperature of the catalyst. The method may include calculating a plurality of sets of engine performance values based on respective sets of candidate control points, the engine performance values including a temperature change rate at which the temperature of the catalyst changes over time, and determining whether the temperature change rate satisfies a minimum warmup rate for the catalyst. The method may also include controlling the internal combustion engine based on a selected set of candidate control points and the minimum warmup rate.

In another aspect, a method for controlling an internal combustion engine system including a catalyst may include receiving a desired output for an internal combustion engine and receiving sensor information including information indicative of a temperature of the catalyst. The method may include calculating a plurality of sets of engine performance values based on respective sets of candidate control points and determining whether at least one set of candidate control points satisfies a minimum warmup rate of the catalyst. The method may also include updating a control map with the candidate control points based on the minimum warmup rate.

In another aspect, a control system for an internal combustion engine system may include a catalyst configured to receive exhaust from an internal combustion engine and a sensor configured to produce a signal indicative of a temperature of the catalyst. The control system may also include a controller, the controller configured to: determine when the catalyst is in a cold condition based on the signal and set a minimum warmup rate of the catalyst based on the determination that the catalyst is in the cold condition. The controller may be configured to determine whether to restrict a flow of air by an intake throttle valve to increase a temperature change rate of the catalyst and update a control map for controlling the internal combustion engine, the updated control map including a position of the intake throttle valve.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
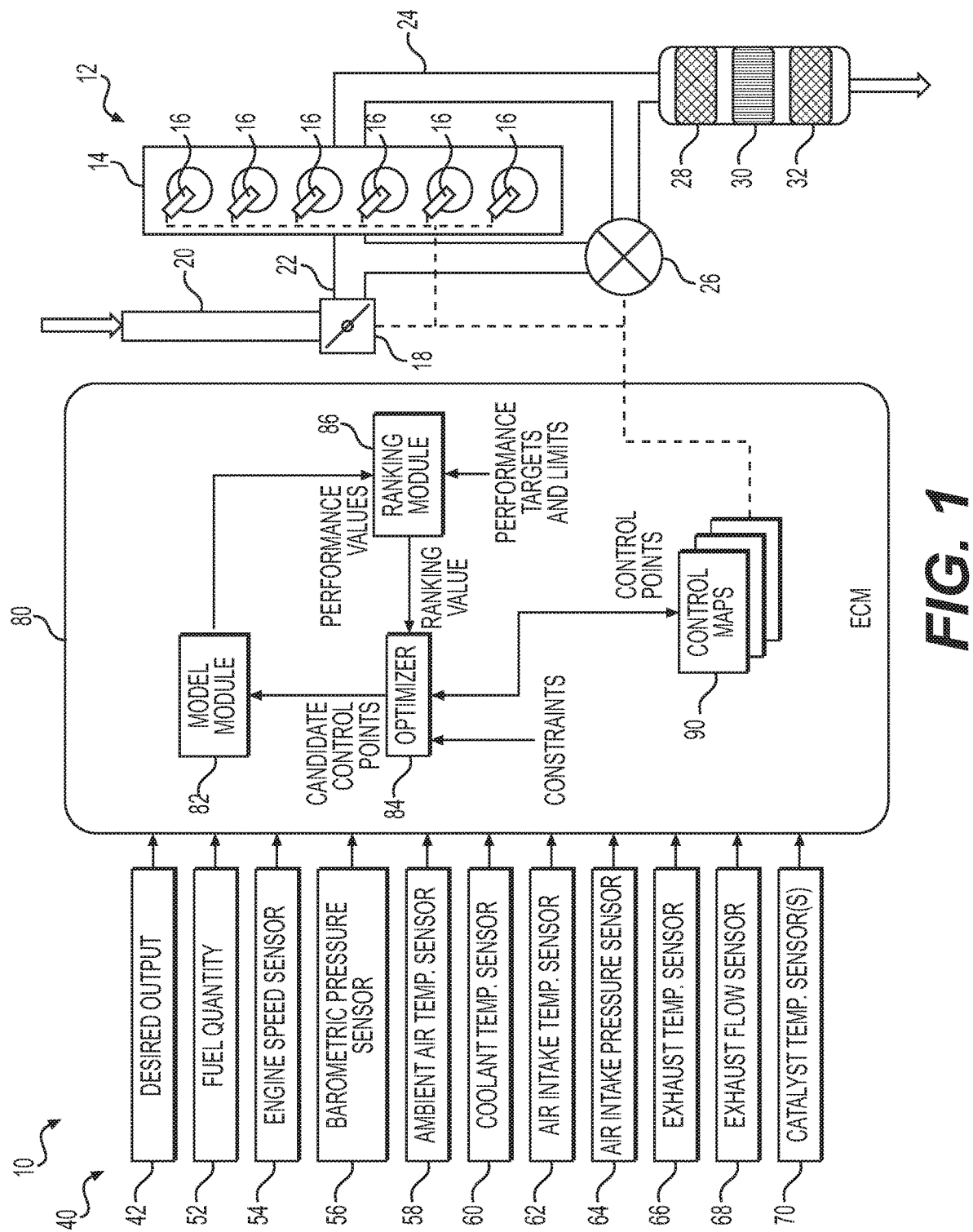
FIG. 1 is a schematic diagram illustrating a control system according to an aspect of the present disclosure.

FIG. 1 illustrates components of a control system 10 for ensuring adequate warmup for one or more catalysts 28, 32, of an internal combustion engine system 12. Control system 10 may include a plurality of inputs 40 associated with internal combustion engine system 12, an electronic control module or ECM 80, and internal combustion engine 14. Inputs 40 may include operator-generated inputs or requests and outputs from a plurality of sensors that measure the states of various components of engine system 12. ECM 80 may be provided as a single engine control module for controlling each component of the internal combustion engine system 12, may be distributed across multiple control units, or may be in communication with one or more additional control units. For example, ECM 80 may be in communication with one or more control units for controlling various sub-systems of engine system 12. Engine system 12 may generate power by the combustion of fuel (i.e., diesel fuel) and may include an air intake system, an exhaust gas recirculation (EGR) system and an aftertreatment system including one or more aftertreatment devices. Internal combustion engine system 12 may be capable of operating on one or more fuels (e.g., diesel fuel, gasoline, and/or gaseous fuel such as natural gas).

Internal combustion engine 14 may include a plurality of combustion chambers formed by a respective plurality of engine cylinders. Each cylinder may receive fuel, for example, via an electronically-controlled fuel injector 16. Fuel injectors 16 may be located in each cylinder for direct injection and/or in an intake port for port injection. An intake passage 20 may be connected upstream of engine 14 to provide air to each of the cylinders. Intake passage 20 may be provided downstream of one or more air compressors (not shown) and may include an intake throttle valve 18, and a downstream air intake passage 22 such as an engine intake manifold for the engine cylinders. The downstream intake passage 22 may be connected to intake valves of each cylinder of internal combustion engine 14. An exhaust passage 24 may be connected downstream of engine 14 to provide a path for exhaust to exit each cylinder. The exhaust passage 24 may be included as part of an EGR system that includes an electronically-controlled EGR valve 26. An aftertreatment system may include one or more aftertreatment devices such as one or more catalysts 28, 32, and a diesel particulate filter (DPF) 30. One or more devices to assist in regeneration of one or more aftertreatment devices may also be provided. Catalysts 28, 32 may include one or more of a diesel oxidation catalyst (DOC) or an selective catalytic reduction (SCR) catalyst.

Inputs 40 may be formed by one or more sensors that output signals to ECM 80. As noted above, inputs 40 may include operator-generated inputs or "desired" inputs to ECM 80, such as desired output 42 of engine 14, as well as "actual" inputs from sensors configured to provide feedback information (e.g., inputs 52-70) corresponding to an actual condition of engine system 12. One or more inputs 40 may be associated with a measured or sensed state of one of the components of engine system 12, such as a state of fuel injector 16, an air intake valve or air intake throttle valve (ITV) 18, or DPF 28.

Desired output 42 may be, for example, a desired production for engine 14 determined based on a measured position of an input device such as a pedal, lever, throttle, etc., or may correspond to a desired action of engine 14. For example, desired output 42 may correspond to a requested amount of torque, or a requested amount of power (e.g., when engine 14 is employed as a component of a generator) that is received as an input to ECM 80. A fuel quantity input 52 may correspond to an actual quantity or mass of injected fuel. Fuel quantity 52 may correspond to one or more flow and/or pressure sensors, for example, attached to one or more fuel lines and/or injectors 16. Engine speed sensor 54 may output a signal that corresponds to a rotational speed of engine 14 (e.g., by measuring rotations per minute of a crankshaft of engine 14). Barometric pressure sensor 56 may measure the pressure of ambient air outside of engine 14. Ambient air temperature sensor 58 may measure a temperature of the air outside of engine 14. Coolant temperature sensor 60 may measure the temperature of coolant employed to maintain engine 14 at a desired temperature. Air intake temperature sensor 62 may measure a temperature of compressed air provided to engine 14, and may be provided within a portion of the air intake system of engine 14 (e.g., within downstream intake passage 22). Air intake pressure sensor 64 may measure a pressure of compressed air, e.g., downstream of ITV 18 and EGR valve 26, that is provided to each cylinder of engine 14. Exhaust temperature sensor 66 may measure a temperature of exhaust after exiting engine 14 (e.g., within exhaust passage 24). Exhaust temperature sensor 66 may include one or more temperature sensors at an upstream portion of exhaust passage 24 and/or at downstream positions, such as a location adjacent to an inlet of an aftertreatment device. Exhaust flow sensor 68 may be provided to measure a flow of exhaust from engine 14, and may be provided in one or more locations of exhaust passage 24.

One or more of the inputs 40 may be associated with an aftertreatment device such as catalysts 28, 32, and/or DPF 30. Catalyst temperature sensor 70 may be provided for each catalyst 28, 32 of engine system 12. Temperature sensors 70 may be provided at any appropriate position within a canister in which one or more catalysts 28, 32 are contained, and/or at appropriate positions immediately upstream and/or downstream of each catalyst 28, 32. Additionally, a soot loading sensor may produce a signal indicative of a quantity of soot present within DPF 30. Signal lines associated with inputs 40 from internal combustion engine system 12 have been omitted for clarity.

ECM 80 may be configured to receive each of the inputs 40 and output control signals to a plurality of electronically-controllable components of engine 14, either directly or by one or more intermediate controllers. ECM 80 may embody a single microprocessor or multiple microprocessors that receive inputs 40 and issue the output control signals. ECM 80 may include a memory, a secondary storage device, a processor, such as a central processing unit or any other means for accomplishing a task consistent with the present disclosure. The memory or secondary storage device associated with ECM 80 may store data and/or software routines to assist ECM 80 in performing its functions. Such memory or secondary storage device(s) may store data that allow ECM 80 to perform the functions of model module 82, optimizer module or optimizer 84, and ranking module 86. The memory may store a plurality of updateable control maps 90. Further, the memory or secondary storage device associated with ECM 80 may also store data received from one or more of the inputs 40 of control system 10. Numerous commercially available microprocessors can be configured to perform the functions of ECM 80. Various other known circuits may be associated with ECM 80, including signal-conditioning circuitry, communication circuitry, and other appropriate circuitry. Inputs 40 may include any additional inputs that provide feedback or other information to ECM 80.

The exemplary modules of ECM 80 shown in FIG. 1, model module 82, optimizer 84, and ranking module 86, may configure ECM 80 to perform various functions such as updating one or more control maps 90. As can be seen in FIG. 1, these modules may provide outputs to each other and to control maps 90.

Control maps 90 stored within ECM 80 may indicate a relationship between a control point (which may take the form of an output) and one or more inputs. The one or more control points of each control map 90 may correspond to commands output by ECM 80 to a controllable component of engine 12 (e.g., fuel injectors 16, ITV 18, and EGR valve 26). Exemplary control points may include start of fuel injection, a mass of fuel injection, requested EGR, and requested intake air pressure (or boost). Other exemplary control points may include: a timing of a main injection, a pilot injection, and/or post-main injection, a shot mode where a pilot and/or post-main injection is performed or omitted, and a number of deactivated cylinders in which fuel injectors 16 are deactivated. Additionally, control points may include a mass of injected fuel (during main injection, pilot injection, and/or post-main injection). Each control point may correspond to, for example, a fuel factor or exhaust factor (which may collectively be referred to as "engine calibration factors"), that do not have a significant affect on the flow (quantity) of exhaust produced by engine 14. Each control point may correspond to an engine restriction factor that may affect (e.g., reduce) a quantity of exhaust produced by engine 14. Control points corresponding to a fuel or exhaust factor may include a timing of the start of injection, mass of injection, injection pressure and/or requested EGR. Control points corresponding to engine restriction may include requested intake air pressure (e.g., by controlling a position of ITV 18).

Control maps 90 may be updateable within the memory of ECM 90, such that the relationship between one or more control points and one or more inputs to control maps 90 may change over time. For example, a control map 90 may be updated with a new or modified control point for one or more particular input(s) to the control map 90. For example, in an EGR control map 90, a particular value of an EGR control point may be updated for a certain set of inputs to the control map 90 (e.g., particular values of desired output 42, engine speed, and requested intake air pressure). While some of the control maps 90 may be updatable, others may be fixed (permanent or non-updateable). ECM 80 may output control signals or control commands to at least one of injectors 16, ITV 18, or EGR valve 26 based on control maps 90.

Optimizer module 84 may search for optimal sets of candidate control points by searching for candidate sets of control points and evaluating each set of control points based on a ranking value for each set of candidate control points. Optimizer module 84 may receive control points from control maps 90 as a first input. These control points may be provided in one or more sets. Each set of control points may correspond to a respective command for one or more controllable features or actuators of engine system 12 (e.g., injectors 16, ITV 18, and EGR valve 26). Optimizer 84 may also receive one or more constraints stored in a memory of ECM 80. These constraints correspond to hard restrictions that can never be exceeded when engine 14 is running. Optimizer 84 may output a plurality of corresponding control points as a set. Optimizer 84 may receive a ranking value associated with each set of candidate control points following analysis of the set of candidate control points by model module 82 and ranking module 86.

Model module 82 may receive each set of candidate control points output by optimizer 84. Model module 82 may also receive one or more of the inputs 40, including desired output 42 and one or more sensed or actual values corresponding to inputs 52-70. Model module 82 may provide an empirical or physics-based model that corresponds to engine system 12. Model module 82 may calculate a plurality of performance values that corresponds to each set of candidate control points. The plurality of performance values may form an output of model module 82.

Ranking module 86 may receive each plurality of performance values from model module 82. Ranking module 86 may also receive each set of candidate control points associated with the plurality of performance values. Ranking module 86 may retrieve, e.g., from a memory of ECM 80, a plurality of performance limits and performance targets. Based on these inputs, ranking module 86 may calculate or otherwise determine a ranking value associated with each set of control points, which may be output to optimizer 84.

INDUSTRIAL APPLICABILITY

The disclosed aspects of control system 10 may be employed in a variety of machines and/or vehicles. For example, control system 10 may be included in any mobile machine having an internal combustion engine that emits NOx and/or CO. Additionally, control system 10 may be employed in any stationary or large machine that includes an internal combustion engine that produces these compounds. Control system 10 may be configured to reduce NOx and CO emissions of any suitable machine or vehicle.

During the operation of control system 10, engine 14 combusts fuel injected by fuel injectors 16. An amount of air entering each cylinder may be controlled by ITV 18. An amount of EGR may be controlled by a position of EGR valve 26. A flow and pressure of intake air may be restricted by intake throttle valve 18. ECM 80 may continuously monitor the operating condition of components of engine system 12 via inputs 40. ECM 80 may update control maps 90 during the operation of engine system 12 based on the operations of model module 82, optimizer 84, and ranking module 86, and may control one or more of the fuel injectors 16, ITV 18, and EGR valve 26, based on the updated control maps 90. In one aspect, fuel injectors 16, ITV 18, and EGR valve 26 may be controlled based on updated control maps 90.

As noted above, sets of control points may be identified by optimizer 84, and may be used to update a plurality of control maps 90. Model module 82 may provide an empirical or physics-based model that corresponds to engine system 12. Ranking module 86 may calculate or otherwise determine a ranking value associated with each set of control points based on performance values output by model module 82.

Optimizer 84 may identify sets of candidate control points by a random selection process, or based on existing information stored in control maps 90. For example, candidate control points may be selected based on control maps for a timing of the start of fuel injection, fuel mass, requested EGR and/or requested intake air pressure. Each control map may define a hypersurface that corresponds to different control points that may satisfy one or more inputs, (e.g., engine speed and desired torque). In one aspect, each set of candidate control points may be identified randomly from control points that satisfy the engine speed and requested torque. However, non-random identification strategies, such as an iterative search, may be employed. Non-random identification strategies may search for sets of candidate control points based on previously-evaluated sets of candidate control points that were determined to be satisfactory. For example, once a satisfactory set of candidate control points is identified, a subsequent search may begin by identifying neighboring control points.

Exemplary control points for injectors 16 may form exemplary fuel factors and may include the start of fuel injection (such as a timing of a main injection, a pilot injection, and/or post-main injection, a shot mode where a pilot and/or post-main injection is performed or omitted, or a number of deactivated cylinders in which fuel injectors 16 are deactivated) and mass of injected fuel (during main injection, pilot injection, and/or post-main injection). Control points for ITV 18 (an exemplary engine restriction factor) and EGR valve 26 (an exemplary exhaust factor) may include the positions (e.g., opening degree) of these valves, and may provide control over amount of EGR, intake manifold pressure, air intake temperature, and other performance values. The search for sets of candidate control points by optimizer 84 may be limited based on boundaries, such as one or more of the above-described constraints, which may be permanently stored in a memory of ECM 80. Moreover, the optimizer 84 may search for each control point based on respective lower and upper boundaries (e.g., minimum and maximum values) associated with each control point. These boundaries may be derived from an engine tune or map stored in the memory of ECM 80. These boundaries may be calculated, for example, based on one or more stored equations (e.g., a lower boundary for a particular control point may correspond to 20% of an expected value for the control point). Exemplary constraints may include minimum and/or maximum values for: fuel injection mass, injection timing, EGR, or intake air pressure. Additionally, one or more constraints (e.g., constraints associated with shot mode, air intake temperature, number of deactivated cylinders, etc.) may apply based on a type of search performed by the optimizer.

Each set of candidate control points may be considered as falling within one of four categories or groupings: a first group in which at least one fuel factor or exhaust factor of engine system 12 (e.g., timing of the start of injection, mass of injection, injection pressure and/or requested EGR) is modified and the restriction factor(s) (e.g., position of the ITV 18) are unmodified; a second group in which the fuel and/or exhaust factors are unmodified and the restriction factor is modified; a third group where at least one fuel factor (and/or exhaust factor), and the restriction factor(s) are modified concurrently; and a fourth group in which none of the fuel factor, exhaust factor, or restriction factor are modified. In one aspect, in the first group, a flow of exhaust may be substantially unaffected by the modified control points. A flow of exhaust may be reduced in the second and third groups, generally in accordance with the amount of restriction of intake air, which may be performed to increase a temperature of engine 14.

As used herein, an adjusted or "modified" factor refers to engine commands and control points that are adjusted or changed to increase the temperature of engine 14 and the exhaust produced by engine 14. Thus, a modified engine factor may cause an increase in a temperature of an aftertreatment device, as compared to an unmodified or standard command. A modified fuel factor may include adjusting fuel injection timing (e.g., advanced or retarded timing). A modified fuel factor may include, instead of or in addition to adjusted fuel injection timing, adjusting the mass of injected fuel (fuel mass) by modifying injection pressure and/or injection duration. Fuel mass may also be adjusted (e.g., increased) to increase exhaust temperature. As understood, adjusting fuel injection and/or fuel mass may increase exhaust temperature and/or exhaust flow. Thus, a modified fuel factor may involve issuing adjusted commands for controlling one or more aspects of injectors 16, such as an injection timing (start of injection), injection pressure, injection duration, etc.

A modified exhaust factor may involve issuing adjusted commands for controlling a position of EGR valve 26. These adjusted EGR valve 26 commands may be issued instead of, or in addition to, adjusted commands for fuel injectors 16. The position of EGR valve 26 may be adjusted to reduce an amount of EGR as compared to an unmodified or standard command for the position of EGR valve 26 when ECM 80 does not seek to increase a temperature of an aftertreatment device or engine 14. In one aspect, a set of control points may adjust at least one of fuel injection timing, mass of injected fuel, or position of EGR valve 26 to increase a temperature of catalyst 28, 32.

An adjusted or "modified" engine restriction factor (e.g., position of ITV 18), may differ from an unmodified or standard position of ITV 18 by partially restricting a flow of air to engine 14. This may cause an increase in the temperature of exhaust produced by engine 14. A modified (restrictive) position of ITV 18 may tend to reduce a flow rate of the exhaust by reducing a quantity of air introduced to engine 14.

Once model module 82 receives one or more sets of candidate control points from optimizer 84, these candidate control points, and one or more of inputs 40, may be used as inputs in the engine model. In an exemplary configuration, the engine model may allow model module 82 to calculate a real-time performance of engine system 12. This engine model may describe a plurality of physical relationships between the inputs to the engine model (candidate control points and at least one input 40) and a plurality of performance values that are output from the engine model. Thus, by inputting the plurality of candidate control points and one or more inputs 40 to the model, model module 82 may calculate a plurality of performance values that correspond to the candidate control points and to the actual conditions of engine system 12.

One exemplary performance value calculated by model module 82 is a temperature change rate of catalyst 28 and/or 32. This change rate may represent a speed at which each catalyst 28, 32 warms or cools. A temperature change rate may be calculated for catalyst 28, catalyst 32, or both, as well as for any other aftertreatment component. The temperature change rate may be positive to represent a warming rate, or negative to represent a cooling rate. A temperature change rate of zero or substantially zero may indicate that the temperature of catalyst 28, 32 is expected to remain substantially constant. Model module 82 may be configured to calculate the temperature change rate based on one or more of the exhaust temperature (input 66), exhaust flow rate (input 68), and the current temperature of the catalyst 28, 32 (input 70). The temperature change rate may also be determined based on the exhaust flow and exhaust temperature that correspond to a particular set of candidate control points. The empirical or physics-based model of model module 82 may be programmed with known relationships between criteria including exhaust temperature, exhaust flow rate, current temperature, and an expected warmup rate for a catalyst. The model may allow model module 82 to calculate the effect a set of candidate control points will have on each of these criteria and thereby determine a temperature change rate for each set of candidate control points. A similar process may be employed to calculate other engine performance values.

Exemplary engine performance values may also include one or more of soot change rate, fuel consumption, transient response, output torque, brake mean effective pressure, or quantity of intake air flow. Further engine performance values may include mass airflow, exhaust manifold temperature, peak cylinder pressure, NOx quantity (before and/or following aftertreatment), soot production rate (a rate of production of soot by engine 14 before and/or following aftertreatment), NOx/soot ratio (before and/or subsequent to aftertreatment), or others. Once each performance value is calculated for one or more sets of candidate control points, the performance values may be output from model module 82 to ranking module 86.

Ranking module 86 may be configured to perform two or more functions to evaluate the performance values for each set of candidate control points. First, ranking module 86 may determine whether the performance values of the candidate control points satisfy one or more performance limits. As a second function, ranking module 86 may calculate a ranking value associated with each set of candidate control points by comparing one or more performance values to a corresponding performance target.

An exemplary performance limit is a minimum warmup rate (limit), which may be a minimum warmup rate associated with catalyst 28, catalyst 32, or both. If desired, different minimum warmup rates may be provided for each catalyst 28, 32. For example, catalysts 28, 32 may have different minimum warmup rates based on different light-off temperatures. These minimum warmup rates may allow the catalysts 28, 32 to reach respective functional temperatures (e.g., a light-off temperature, or a predetermined threshold temperature where the catalyst is sufficiently active, etc.) at an appropriate time. Moreover, different minimum warmup rates may be stored in ECM 80 and applied based on one or more operating conditions of engine 14. ECM 80 may lookup the warmup rate performance value by referring to a map. For example, a map may be provided to determine a minimum warmup rate based on a load of engine 14. A relatively low minimum warmup rate may be set when the engine 14 operates in a low load condition. A larger minimum warmup rate may be applied when engine 14 operates in a mid-load condition. Finally, an even larger minimum warmup rate may be applied when engine 14 operates in a high-load condition. Alternatively, the warmup rate may be a constant value associated with the cold condition. Additional exemplary performance limits may include limits for NOx production, exhaust temperature, coolant temperature, etc.

Performance limits may be set or removed (lifted) based on a sensed or calculated operating condition of one or more components of engine system 12. One exemplary performance limit may be the minimum warmup rate, which may be removed under particular conditions. Ranking module 86 may receive the temperature of catalysts 28, 32 from catalyst temperature sensor(s) 70, and remove the minimum warmup rate for one or both catalysts 28, 32 when the temperature of that catalyst is higher than a predetermined threshold value. In an exemplary embodiment, a temperature of 250 degrees Celsius may be associated with a cold condition such as a cold start condition and may form an exemplary predetermined threshold value. In one aspect, the predetermined threshold value may be a value between 200 degrees Celsius and 250 degrees Celsius. Thus, a cold condition may be associated with a condition during which the temperature of catalysts 28, 32 is relatively low. In addition to a cold start condition, a cold condition may arise when the engine 14 operates at low load for a period of time. The minimum warmup rate may be a positive value when one or more catalyst 28, 32 is determined to be in a cold condition (e.g., a temperature of catalyst temp sensor(s) 70 is below a predetermined temperature threshold). Other performance limits may be applied regardless of the operating conditions of system 12.

Performance limits may be defined by a fixed (permanent) value or range, or may have a value or range that is adjusted by ranking module 86 during operation of internal combustion engine system 12. For example, ranking module 86 may be configured to change one or more of the performance limits based on sensed or calculated conditions of one or more components of internal combustion engine system 12. In an exemplary configuration, the minimum warmup rate for catalyst 28 and/or catalyst 32 may be adjusted by ranking module 86. For example, ranking module 86 may change the minimum warmup rate from a first (higher) value at a beginning of a cold condition when a temperature of catalysts 28, 32 is relatively cold, and change the minimum warmup rate to a second (lower) value as the temperature of catalysts 28, 32 nears or reaches the predetermined temperature threshold associated with the cold condition.

Regarding the second function of ranking module 86, this module may calculate a ranking value for each set of candidate control points. The ranking value may be calculated by evaluating each set of performance values with respect to corresponding performance targets. For example, ranking module 86 may compare a catalyst warmup rate performance value to a minimum warmup rate target. This comparison may include determining a magnitude of the difference between the performance value and target. Additionally, each performance target may be associated with a weighting factor that reflects a relative importance of the performance target. One or more weighting factors may be permanent or fixed values stored in ECM 80, while other weighting factors may be user-editable (e.g., within predefined boundaries). Weighting factors may correspond to a relative importance of each performance target.

Ranking module 86 may calculate the ranking value based on the comparison of each performance value with the corresponding performance target and each associated weighting factor. The ranking value may be provided as a single value for a set of candidate control points (and the associated performance values). In an exemplary configuration, the ranking value may be calculated with a cost function. Thus, costs may be calculated for a plurality of performance values based on the deviation from the performance target. The ranking value may represent a sum of these costs, taking into account the relevant weighting factors for each cost. When the ranking value is determined on the basis of a cost function, a preferable (desired) ranking value may correspond to a lower value. However, the ranking value may alternatively represent a desirability score, in which a higher value may represent a preferable ranking value. Each set of candidate control points may be provided, with the associated ranking value, to optimizer 84, which compares the respective ranking values to identify a highest ranked set of candidate control points. Maps 90 may be updated when a set of candidate control points is determined to satisfy each limit and is found to have a preferable ranking value as compared to one or more other sets of candidate control points. Each updated map 90 may be stored in a memory of ECM 80. The updated map 90 may be used during a subsequent cold condition or cold start of engine system 12, for example.

When catalyst 28, 32 is in a cold condition, ECM 80 may operate engine system 12 based on one or more sets of control points belonging to any of the above-described groups of control points, and may freely shift between sets of control points in each group when controlling engine system 12, based on the optimal sets of control points identified by model module 82, optimizer 84, and ranking module 86. In one aspect, ECM 80 may control engine system 12 while catalyst 28, 32 is in a cold condition based on a set of control points corresponding to the first group in which at least one fuel and/or exhaust factor is modified and the restriction factor(s) are not modified. After the catalyst 28, 32 has partially warmed, but while still in the cold condition, ECM 80 may operate engine system 12 based on one or more sets of control points in the third group in which at least one fuel factor (and/or at least one exhaust factor) and the restriction factor are modified concurrently. Thus, when the catalyst 28, 32 is significantly colder than a predetermined threshold, ECM 80 may evaluate sets of candidate control points from each group, and may tend to control system 12 with control points from the first group in which start of injection, mass of injection, injection pressure and/or requested EGR may be adjusted by differing amounts. Once catalyst 28, 32 has warmed to a temperature that nears the predetermined threshold, ECM 80 may continue to evaluate sets of candidate control points from each group, and may tend to control system 12 with control points from the third group. This shift may be determined based on the operation of model module 82, optimizer 84, and ranking module 86, and without the need to provide a pre-determined mapping corresponding to such shift.

As described above, ECM 80 may tend to shift from the first group to the third group during a cold condition such as a cold start. The timing of this shift may be determined based on the real-time calculation of performance values and ranking values and may be adjusted by updating control maps 90. As such, the timing of this shift in a first cold condition may be different from a timing of this shift in a second cold condition. For example, ECM 80 may be configured to update the timing of this shift based on actual conditions provided as inputs to model module 82 and based on the corresponding performance values. Additionally, ECM 80 may modify which groups of control points are employed during each cold condition, and the timing of each transition from one group to another, if any. Thus, ECM 80 may control engine 12 based on any combination of groupings that satisfy the applied performance limit(s) and correspond to the highest ranking value.

Figure 2:
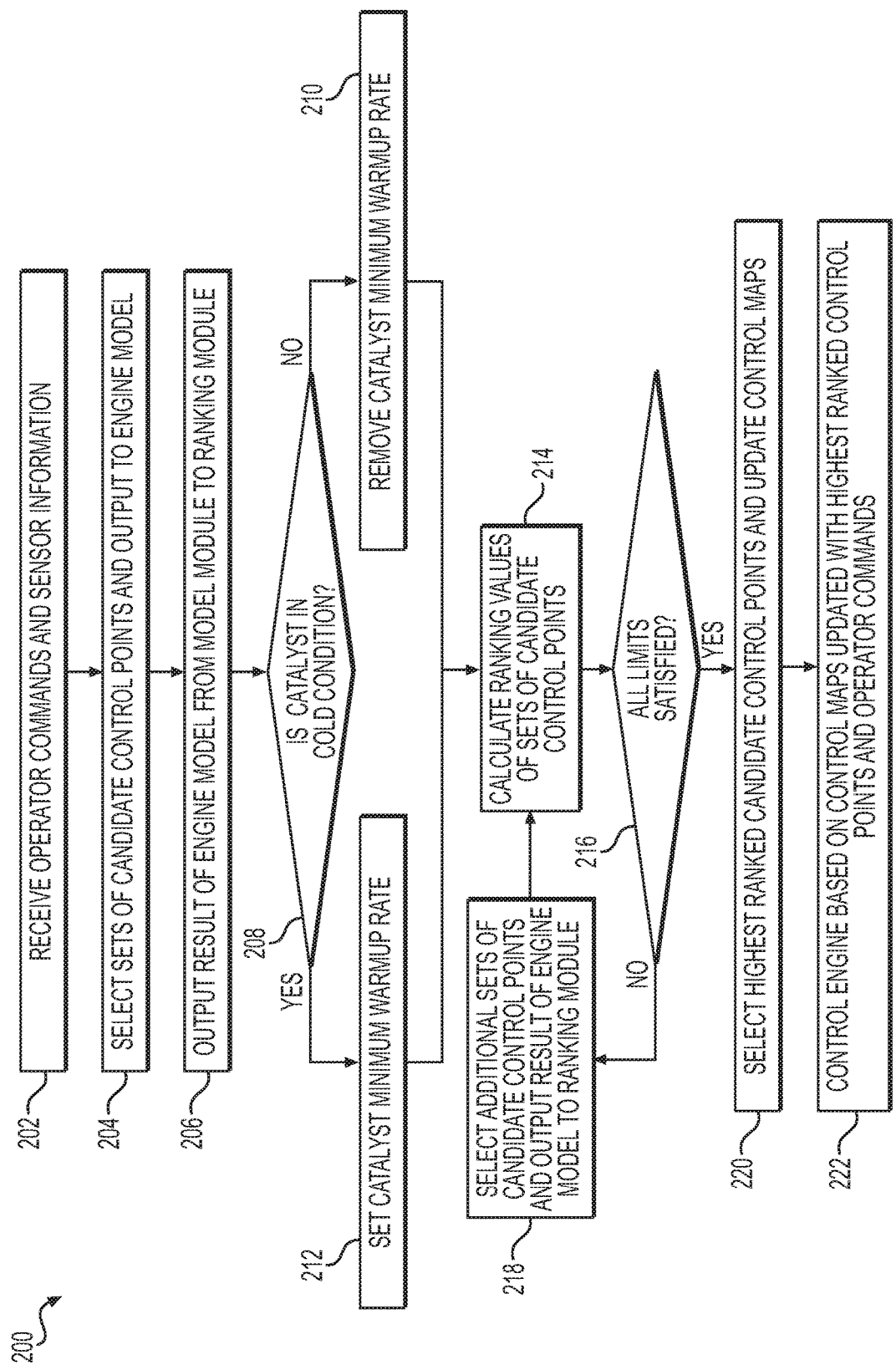
FIG. 2 is a flowchart illustrating a method according to the control system of FIG. 1.

FIG. 2 illustrates a control method 200 that may be performed by exemplary control system 10. In a step 202 of method 200, ECM 80 may receive an operator command, such as desired output 42 associated with a request for a particular output from internal combustion engine 14. A desired output 42 may take the form of a requested torque to be produced by internal combustion engine 14, a requested power to be produced by internal combustion engine 14, etc. For example, desired output 42 may correspond to an operator command issued by an input device, as described above. Step 202 may also include receiving each item of information from the sensors of engine system 12, e.g., by inputs 40, including a signal indicative of an temperature of catalyst 28 and/or catalyst 32 from sensor(s) 70. Step 202 may be performed at regular intervals during method 200 and during the operation of engine 14. For example, step 202 may be performed at approximately 60 millisecond (ms) intervals, 120 ms intervals, or any other appropriate interval.

In step 204, optimizer 84 may select (e.g., randomly or by searching control maps 90) a plurality of sets of candidate control points. In an exemplary configuration, 1,000 sets of candidate control points may be selected in step 204. The selected sets of candidate control points may be output from optimizer 84 to model module 82. The sets of candidate control points selected in step 204 may each fall within one of the four above-described groups.

In step 206, based on these sets of candidate control points, model module 82 may calculate corresponding sets (e.g., 1,000 sets) of performance values. The performance values may be determined from the output of the engine model of engine system 12. Respective catalyst warmup rates may be calculated for each set of candidate control points to determine rates at which catalyst 28, 32 is expected to warm. The performance values for each set of candidate control points may correspond to a plurality of the above-described groupings, including at least one of: the first group in which only one or more fuel or exhaust factors are modified, the second group in which only the position of ITV 18 is modified, and the third group in which one or more fuel or exhaust factors and the position of ITV 18 are modified.

Steps 208-212 provide an exemplary process for setting or changing one of the performance limits based on a condition of a component of engine system 12. Step 208 may include determining the warmup rate of catalysts 28, 32, based on sensor information indicative of this temperature (e.g., as output from catalyst temperature sensor 70). For example, step 208 may include determining whether catalysts 28, 32 are in the cold condition such as a cold start condition by comparing the temperature of one or both catalysts 28, 32 to a predetermined threshold.

When one or more catalysts 28, 32 are in the cold condition, step 212 may be performed. In step 212, the ranking module 86 may set the minimum warmup rate (performance limit) to require an increase in the temperature of catalysts 28, 32. Optionally, a minimum warmup rate target (performance target) may be set in step 212.

When catalysts 28, 32 are not in the cold condition, step 210 may be performed. In step 210, the minimum warmup rate may be removed or lifted. Step 210 may include allowing the temperature of catalysts 28, 32 to fluctuate freely based on the operation of engine system 12. Step 210 may include setting a performance target associated with the temperature of catalysts 28, 32 (e.g., a minimum warmup rate target) in place of a limit.

Step 214 may follow either step 210 or step 212 and may include calculating a ranking value associated with each set of candidate control points. Step 214 may be performed by comparing performance values for each set of candidate control points with one or more respective performance targets. Step 214 may include calculating a plurality of ranking values, each ranking value corresponding to a set of candidate control points that were selected in step 204. In an exemplary configuration where 1,000 sets of candidate control points were selected in step 204 and evaluated with the engine model in step 206, 1,000 corresponding ranking values may be calculated in step 214.

In step 216, the performance values for each set of candidate control points may be compared to each of the limits, including the minimum warmup rate set in step 212. For example, in step 216, optimizer 84 may identify which sets of candidate control points satisfy each of the limits, including the minimum warmup rate. These sets of candidate control points may modify one or more of the fuel or exhaust factors, one or more engine restriction factors, or both a fuel (and/or exhaust) factor and an engine restriction factor.

In step 218, when none of the sets of candidate control points satisfy these limits, the set of candidate control points having the most preferable ranking value may be stored in a memory of ECM 80. Thereafter, additional sets of candidate control points (e.g., 1,000 new sets of candidate control points) may be selected by optimizer 84 and output to model module 82. Step 218 may also include evaluating each additional set of candidate control points with the engine model, and outputting the results (performance values) to ranking module 86. Step 218 may be performed in a manner similar to steps 204 and 206. Following step 218, method 200 may return to step 216 to determine whether one or more of the additional sets of candidate control points satisfies each of the limits. Steps 214-218 may be repeated until at least one set of candidate control points that satisfies each limit is identified. If, after a predetermined time period, a set of candidate control points that satisfies all limits is not identified, ECM 80 may operate engine system 12 based on a previously-identified set of candidate control points (e.g., stored in maps 90), or based on the set of candidate control points with the most preferable ranking value. The process may then return to step 202 and updated operator commands and sensor information may be received.

In step 220, optimizer 84 may select the highest (most preferable) ranked set of control points from the sets of control points that were determined to satisfy each of the limits. Once the most preferable set of control points is selected, one or more control maps 90 may be updated based on the set of control points with the most preferable ranking. The highest ranked set of candidate control points may belong to the first group in which only a fuel or exhaust factor is modified, the second group in which only the position of ITV 18 is modified, or the third group in which both one or more fuel or exhaust factors and position of ITV 18 are modified.

In step 222, at least one component of engine system 12 may be operated based on a desired output 42 and the control map(s) that were updated in step 220, for example, in a manner that satisfies the minimum warmup rate. Thus, each limit, including minimum warmup rate, may be satisfied during the operation of engine system 12.

During the cold condition, method 200 may be repeatedly performed to continuously evaluate sets of candidate control points and update control maps 90. The updated control maps 90 may allow the control system 10 to control engine system 12 in accordance with a first set of candidate control points belonging to the first group, a second set of control points belonging to the second group, and a third set of candidate control points belonging to the third group within a single cold condition. For example, in a first cold condition of engine system 12, ECM 80 may control engine system 12 based on control points in the first group by adjusting one or more fuel or exhaust factors (e.g., adjusting at least one of a fuel injection timing, a mass of injected fuel, a fuel injection pressure or a position of an exhaust gas recirculation valve), without restricting a restriction factor (flow of air by ITV 18). At a later time during the first cold condition, ECM 80 may transition to the third group where at least one fuel factor and/or exhaust factor is modified and ITV 18 are modified. This transition may be performed (or begin) at a first timing, for example. In a second cold condition of engine system 12, another (second) timing of this transition may be different than the first timing, and may be based on the performance values and ranking values calculated during operation of engine system 12. Thus, ECM 80 may change the timing at which a restriction factor begins to be applied based on real-time calculations of the engine model. In a third exemplary cold condition of engine system 12, ECM 80 may initially control engine system 12 based on control points in the third group. In accordance with method 200, any combination of control points from the first, second, and third groups may be used to control engine system 12 in a single cold condition. For example, during a single cold condition, ECM 80 may control engine system 12 based on control points in only one group, in any two of the three groups, or in all three groups, based on control points that were updated in control maps 90.

As the temperature of catalysts 28, 32 may be regularly or continuously monitored, the minimum warmup rate may be applied, removed, or changed accordingly. While method 200 may be performed by evaluating a plurality of candidate control points over a predetermined period of time (e.g., 1,000 control points or more in a 60 ms period of time), method 200 may include selecting sets of candidate control points (step 204), outputting the result of the engine model to ranking module 86 (step 206), and calculating a ranking value (step 214) for individual sets of candidate control points.

Control system 10 and method 200 may achieve improved performance while reducing emissions of NOx and CO. Thus, unlike a conventional engine and aftertreatment system, system 10 and method 200 may be able to determine an appropriate strategy for warming a catalyst 28, 32 based on current operating and ambient conditions. For example, control system 10 may determine whether the minimum warmup rate may be satisfied by engine calibration (fuel and/or exhaust factors), intake valve restriction, or both. The control system 10 and method 200 described herein may allow ECM 80 to calculate, with an empirical or physics-based engine model, a rate at which a catalyst 28, 32 will warm during a cold condition. The engine model programmed in the ECM 80 may allow the ECM 80 to control internal combustion engine system 12 dynamically, based at least in part on the need to increase the temperature of catalysts 28, 32. Thus, the system 10 and method 200 may provide a more precise method for quickly raising the temperature of catalysts 28, 32. Additionally, by providing updatable control maps, the system 10 and method may identify new sets of control points that satisfy the required minimum warmup rate and other performance requirements for engine system 12.

It will be apparent to those skilled in the art that various modifications and variations can be made to the disclosed method and system without departing from the scope of the disclosure. Other embodiments of the method and system will be apparent to those skilled in the art from consideration of the specification and practice of the systems disclosed herein. It is intended that the specification and examples be considered as exemplary only, with a true scope of the disclosure being indicated by the following claims and their equivalents.

What is claimed is:

1. A method for controlling an internal combustion engine system including a catalyst, the method comprising:
   receiving a desired output for an internal combustion engine;
   receiving sensor information including information indicative of a temperature of the catalyst;
   calculating a plurality of sets of engine performance values based on respective sets of candidate control points, the engine performance values including a temperature change rate at which the temperature of the catalyst is expected to change over time;
determining whether the temperature change rate satisfies a minimum required warmup rate for the catalyst; and
controlling the internal combustion engine based on a selected set of candidate control points and the minimum required warmup rate.

2. The method according to claim 1, wherein the sets of candidate control points include a first set of candidate control points that satisfies the minimum required warmup rate by adjusting at least one of:
a fuel injection timing;
a mass of injected fuel; or
a position of an exhaust gas recirculation valve.

3. The method according to claim 2, wherein the sets of candidate control points include a second set of candidate control points that satisfies the minimum required warmup rate by adjusting a position of an intake throttle valve for controlling a flow of air to the internal combustion engine.

4. The method according to claim 3, further including determining a ranking associated with the first set of candidate control points and the second set of candidate control points, wherein one of the sets of candidate control points is selected based on the ranking.

5. The method according to claim 3, wherein the sets of candidate control points include a third set of candidate control points that satisfies the minimum required warmup rate by:
adjusting an injection timing or a mass of injected fuel for one or more fuel injectors; and
adjusting a position of an intake throttle valve to restrict a flow of air to the internal combustion engine.

6. The method according to claim 1, further including increasing the temperature change rate by restricting a flow of air by an intake throttle valve at a first timing during a first cold condition of the internal combustion engine.

7. The method according to claim 6, further including, during a second cold condition of the internal combustion engine, increasing the temperature change rate by restricting a flow of air by the intake throttle valve at a second timing that is different from the first timing.

8. The method according to claim 1, further including updating a control map based on the selected set of candidate control points.

9. The method according to claim 1, wherein the sets of candidate control points include control points for one or more of fuel mass, start of fuel injection, amount of exhaust gas recirculation, or intake air pressure.

10. The method according to claim 1, wherein the engine performance values include one or more of an amount of a fuel consumption, a transient response, an output torque, a brake mean effective pressure, a quantity of intake air flow, or an NOx production.

11. A method for controlling an internal combustion engine system including a catalyst, the method comprising:
receiving a desired output for an internal combustion engine;
receiving sensor information including information indicative of a temperature of the catalyst;
calculating a plurality of sets of engine performance values based on respective sets of candidate control points;
retrieving a minimum required warmup rate of the catalyst based on one or more operating conditions of the internal combustion engine system;
determining whether at least one set of candidate control points satisfies the minimum required warmup rate; and
updating a control map with the candidate control points based on the minimum required warmup rate.

12. The method according to claim 11, wherein the updated control map is stored in a memory of a controller for the internal combustion engine for operating the internal combustion engine during a subsequent cold condition.

13. The method according to claim 11, wherein the candidate control points satisfies the minimum required warmup rate by:
adjusting at least one of a fuel factor or an exhaust factor; or
adjusting a position of an intake throttle valve to reduce a flow of air.

14. A control system for an internal combustion engine system, comprising:
a catalyst configured to receive exhaust from an internal combustion engine;
a sensor configured to produce a signal indicative of a temperature of the catalyst; and
a controller configured to:
receive the signal from the sensor;
determine when the catalyst is in a cold condition based on the signal;
set a minimum required warmup rate of the catalyst based on the determination that the catalyst is in the cold condition and based on a load condition of the internal combustion engine;
determine whether to restrict a flow of air by an intake throttle valve to increase a temperature change rate of the catalyst; and
update a control map for controlling the internal combustion engine, the updated control map including a position of the intake throttle valve.

15. The control system according to claim 14, wherein the controller is configured to increase the temperature change rate by adjusting at least one of a fuel injection timing, a mass of injected fuel, or a position of an exhaust gas recirculation valve, during a first cold condition of the internal combustion engine.

16. The control system according to claim 15, wherein the controller is configured to increase the temperature change rate by restricting a flow of air by the intake throttle valve at a first timing during the first cold condition of the internal combustion engine.

17. The control system according to claim 16, wherein, during a second cold condition of the internal combustion engine, the controller is configured to increase the temperature change rate by restricting a flow of air by the intake throttle valve at a second timing that is different from the first timing.

18. The control system according to claim 14, wherein the controller is configured to control an operation of the internal combustion engine based on the updated control map.

19. The control system according to claim 18, wherein the controller is configured to store the updated control map in a memory of the controller for operating the internal combustion engine during a subsequent cold condition.

20. The control system according to claim 14, wherein the controller is configured to determine whether a plurality of engine performance values satisfy a plurality of performance limits that includes the minimum required warmup rate.

* * * * *